O. CROCHET.
PRESS FOR AGGLOMERATING COMBUSTIBLE BRIQUETS.
APPLICATION FILED MAY 4, 1907.

932,682.

Patented Aug. 31, 1909.
4 SHEETS—SHEET 4.

WITNESSES
W. P. Burke
A. F. Heuman

INVENTOR
Octave Crochet
BY
ATTORNEYS

UNITED STATES PATENT OFFICE.

OCTAVE CROCHET, OF ALAIS, FRANCE, ASSIGNOR TO LA SOCIÉTÉ DE CONSTRUCTIONS MECANIQUES D'ALAIS, OF ALAIS, FRANCE.

PRESS FOR AGGLOMERATING COMBUSTIBLE BRIQUETS.

932,682. Specification of Letters Patent. Patented Aug. 31, 1909.

Application filed May 4, 1907. Serial No. 371,948.

*To all whom it may concern:*

Be it known that I, OCTAVE CROCHET, a citizen of the Republic of France, and resident of Alais, France, have invented a new and useful Improvement in Presses for Agglomerating Combustible Briquets, which improvement is fully set forth in the following specification.

The present invention has for its object a press to agglomerate combustible briquets.

This press is illustrated, by way of example, in the accompanying drawings, in which—

Figure 1:
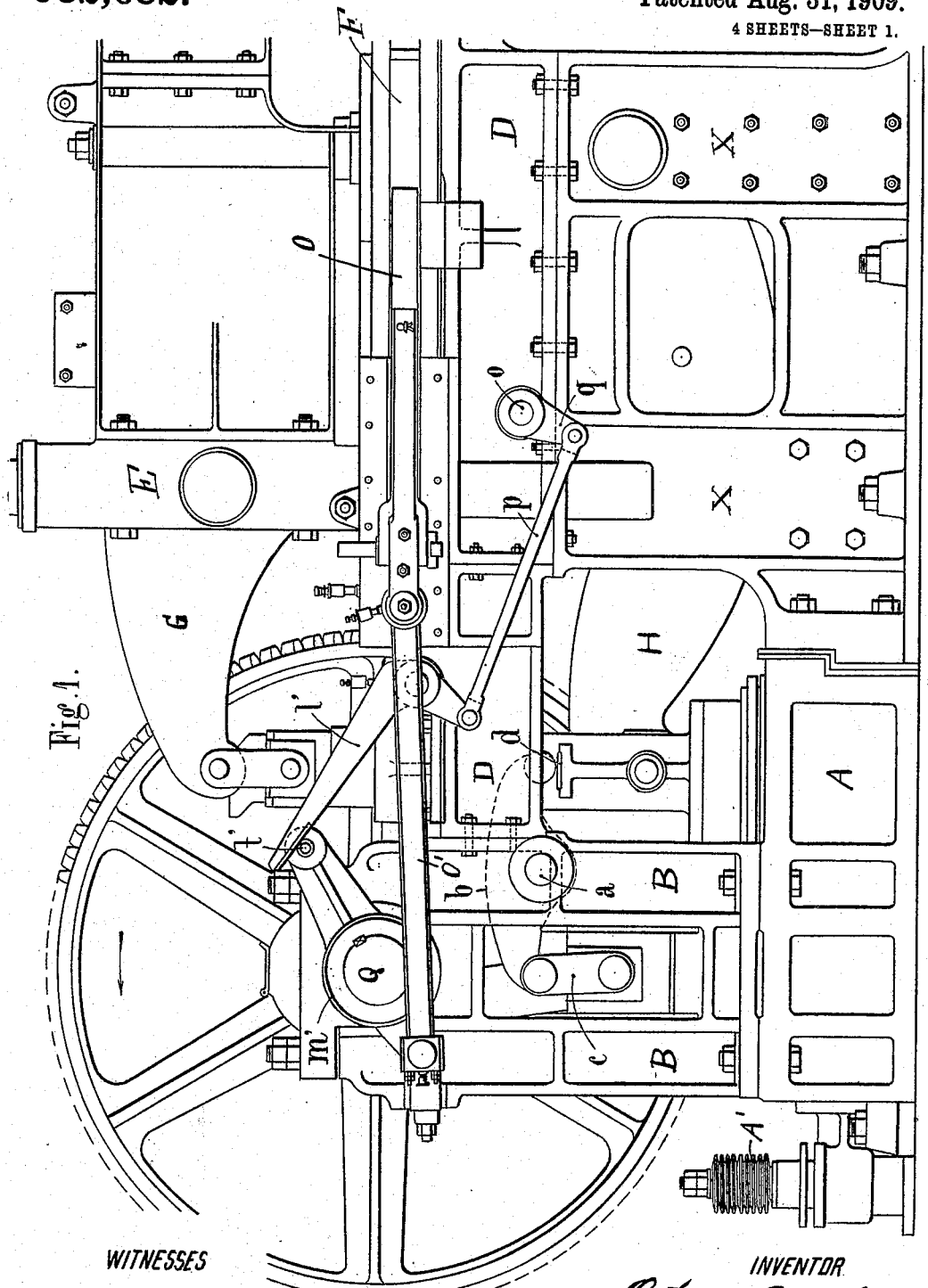
Figure 2:
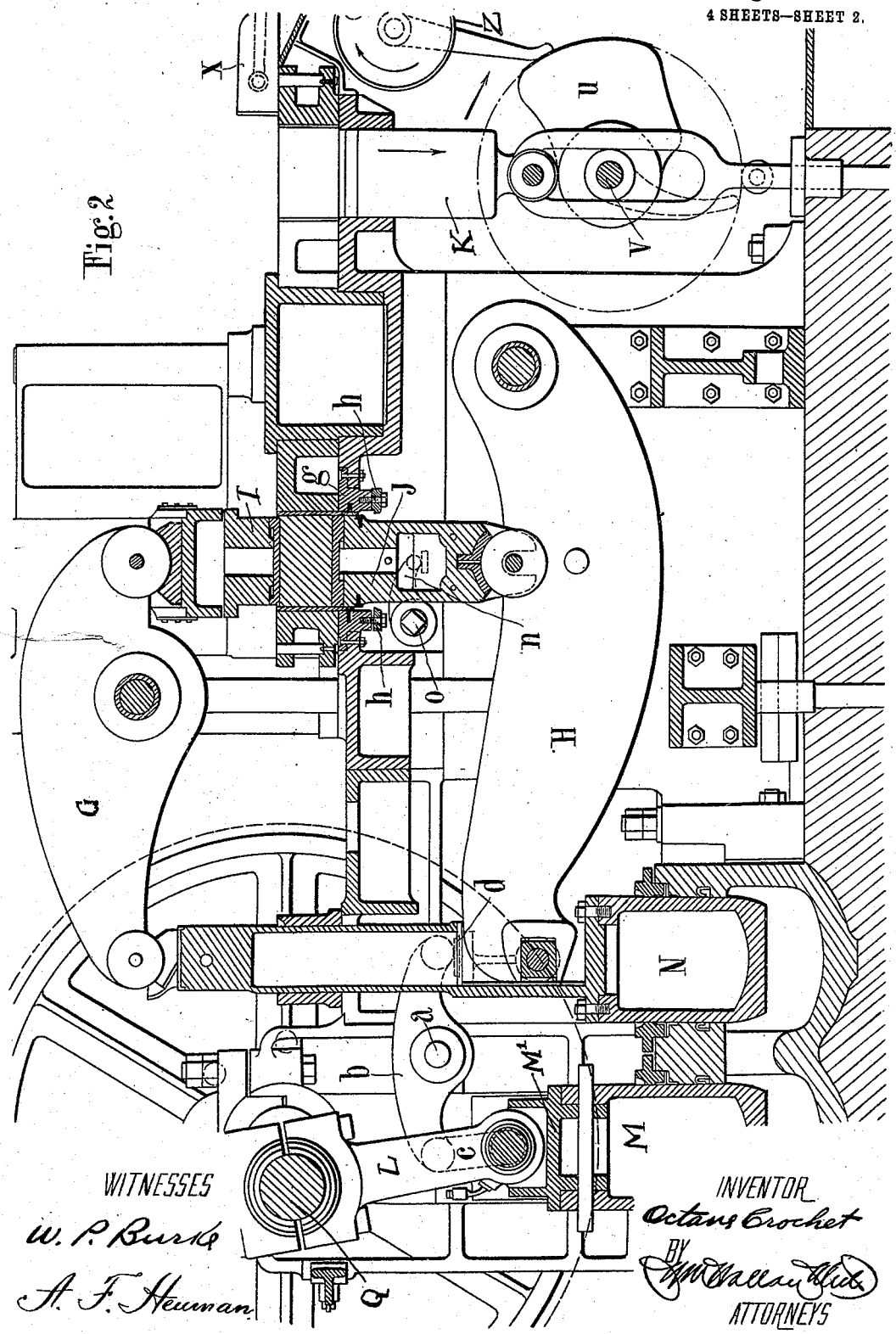
Figure 3:
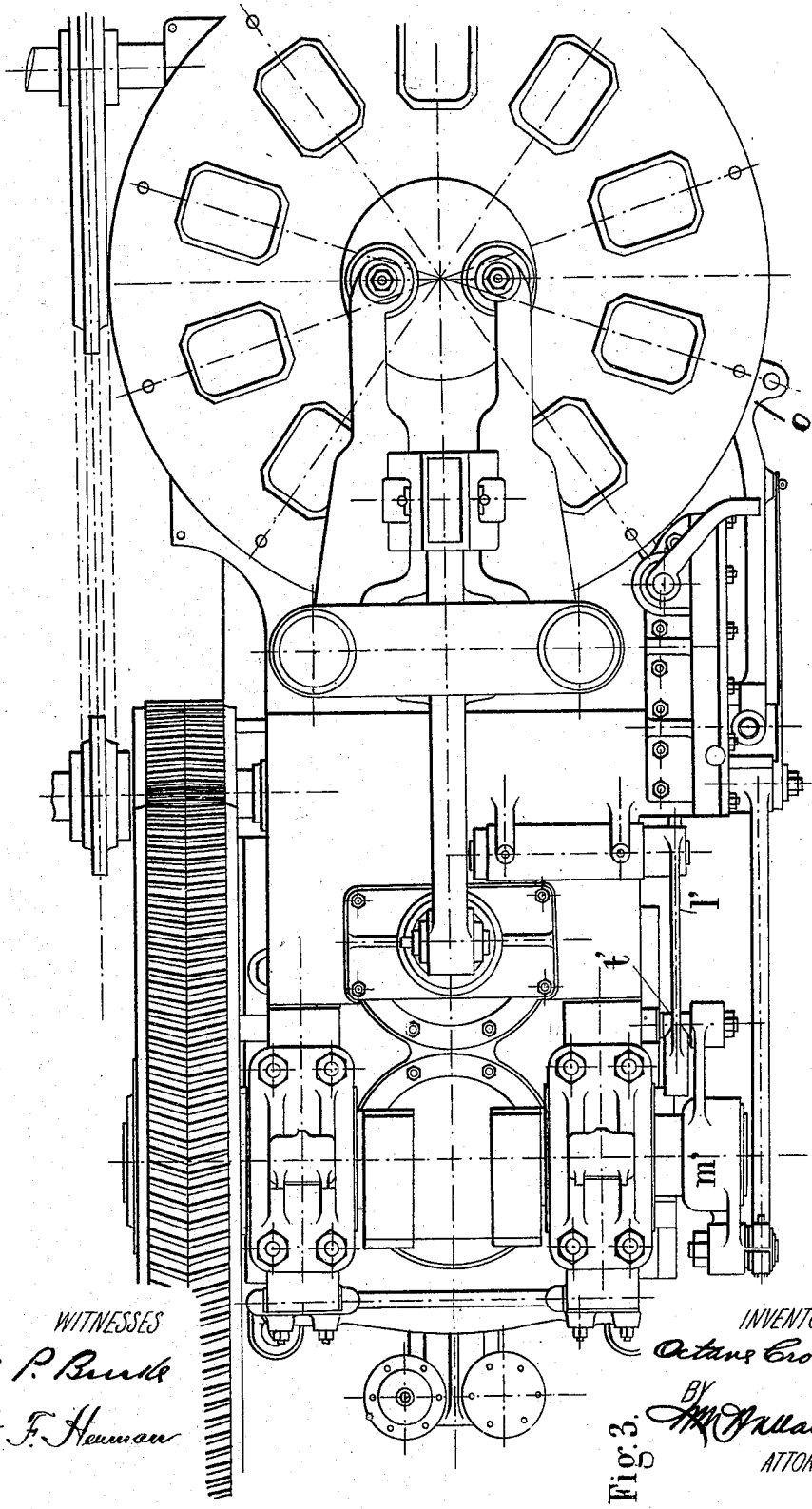
Figure 4:
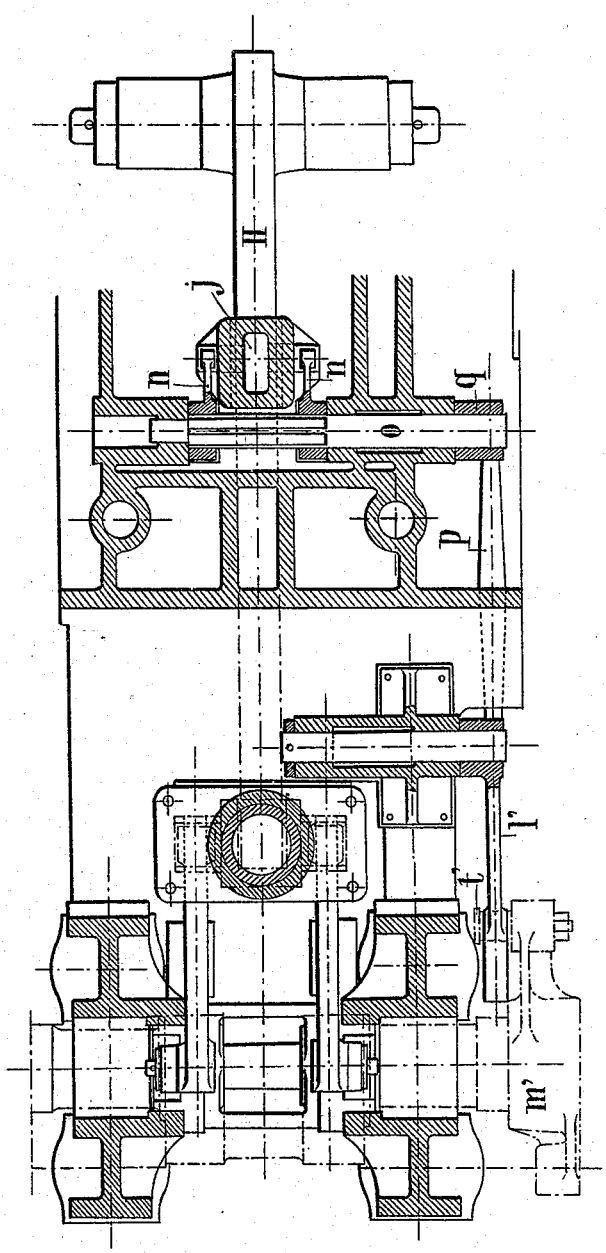

Figure 1 is a front elevation. Fig. 2 is a longitudinal section. Fig. 3 is a plan view. Fig. 4 is a horizontal section.

This press comprises a double hydraulic press A (Fig. 1) with a spring safety valve A'. Two vertical frames B are bolted on the press pot and serve as a bearing for the motive crank shaft Q. Besides these two frames are provided two others X, also bolted to the press pot and which are solidly braced by a cast iron piece receiving the axis of articulation of the lower lever H. A platform D is fastened on the two guide frames B and to the two lateral frames X. Said platform receives and supports a celled plate F arranged in such a manner that it can have no movement save that of rotation around its center. The press also comprises an upper lever G with the support E for its axis of articulation, and the lower lever H, the axis of articulation of which is supported, as already mentioned, by the frame X. Two molding pistons I, J, are carried by the levers G and H. The lifting (or unmolding) piston, K is arranged, as represented in Fig. 2, at the extremity of the machine and is operated by a special driving-gear which will be hereinafter described. The hydraulic pistons are two in number; the motive hydraulic piston M which transmits the motion of the motive shaft Q by means of the rod L, and piston N which transmits the motion to the levers G H. A dog O turns the celled plate F one division at each operation. This dog is operated by the motive shaft Q by means of a rod O'. The apparatus also comprises the return balances of the hydraulic pistons and a motive gear wheel.

There will now be described in detail the characteristic arrangements of the press forming the object of the invention, and above all that which has particular relation to the return levers of the hydraulic pistons.

The shaft $a$ bearing the return levers $b$ turns in two sockets cast with the frames B of the crank shaft; these sockets are drilled at the same time by means of a special mounting; the trueness and the parellelism of the shaft are thus obtained in a perfect manner. Each of the two levers $b$ is jointed at one of its extremities to the axis of the sliding block M' of the motive rod L by means of a small connecting rod $c$. The other extremity is supported on a block of hardened steel carried by the rod of piston N. The return movement is produced thus in a very simple manner, all the parts are visible and easily accessible.

Means are also provided to assure the disengagement of the lower molding piston from the cell a little in advance of the commencement of the rotation of the plate, which presents the advantage of attenuating to a large extent the shock and the very noticeable noise by reason of the size of the masses in motion. To this end, the head of the lower lever H is jointed to the hydraulic piston N and the lower piston J is carried free on this lever. At the lower part of the guide $g$ of the piston J are arranged two blocks $h$, of hardened steel easily dismounted and serving as a rest for the lower piston when it has disengaged the cell sufficiently. Two small return levers $n$ keyed on the same shaft $o$ are connected by a rod $p$ and a crank $q$ to the double lever $l''$, one extremity of which can be operated by the pin $t''$ of the crank $m'$; the pin bears a roller of hardened steel and the wearing part of the double lever is also of hardened steel; the two lateral sides of the lower piston in the form of a T are furnished at their upper part with a key of hardened steel easily dismounted and on which are supported the two small return levers $n$ (see Fig. 4).

From the preceding it will be seen that as, on the one hand, the lower lever and the hydraulic piston N are solidly jointed, and as, on the other hand, the lower piston is not jointed to the same lever, it follows that the return movement has only to assure the descent of the lower piston alone, and as the weight of this piece does not exceed 200 kilos, it results therefrom that the shock and the noise are attenuated to such an extent that they can be considered as suppressed.

The ejector K is operated by an eccentric with a cam $u$ keyed to a horizontal shaft $v$ receiving its motion from the shaft of the machine by suitable means.

The cam $u$ is calculated to produce successively the following movements: 1st, rapid coming into contact of the ejector with the agglomerated briquet; 2nd, very slow and progressive ejecting; 3rd, disengagement of the ejector.

An arrangement for removing the briquet (Fig. 2) consists of a scraper $x$ open on one side and operated by the shaft $v$ and produces, due to a system of levers and rods properly arranged, the following movements:—1st. Removal of the ejected briquet. 2nd. Rapid return to the rear of the briquet remover.

The general operation of the machine comprises two essential phases; the first relates to the course of the motive shaft Q downwardly so as to produce the molding and the ejecting, and the second to the course of the same shaft upwardly, which causes the disengagement of the two molding pistons I, J and of the ejecting piston K, and sets up the rotation of the celled plate F by one division. At each turn which the crank makes, the dog O causes the rotation of the plate F, one division, that is to say, one cell. By this the full cells are successively presented between the two molding pistons I, J and it is there that the agglomeration is effected. After this operation, the plate conveys the finished brick to the ejecting piston which removes it from the mold. This briquet is seized by the scraper $x$ which causes it to fall upon the endless conveying canvas Z. The downward movement of the crank shaft Q causes the hydraulic piston M to sink in the press pot A and forces the second piston N upwardly. In this movement, the piston N raises the extremities of the two levers G, H. The two fixed supporting points of these two levers being on opposite sides of the two molding pistons, I, J, the latter have movements in contrary directions, that is to say, the upper molding piston I descends while the lower molding piston J ascends. They penetrate at the same time into the cell and consequently give a double compression. It should be added that by this same operation, the ejecting piston rises in a cell and ejects one of the briquets previously agglomerated. When the motive hydraulic piston M accomplishes its upward stroke, the second piston N is aided in its descending movement by the return levers $b$. This movement causes the extremities of the levers G, H and the lower molding piston J to descend while the upper molding piston I ascends. The ejector K descends and finally all the pistons are disengaged from the cells. Then the motion of the dog O enters into play and makes the plate F turn one division, and when the crank shaft Q is as high as its dead point, another cell filled with the mixture to be agglomerated is presented to the molding pistons ready to receive the compression.

Claims.

1. An agglomerating press comprising a mold carrying element, upper and lower molding pistons, actuating levers for said pistons, a hydraulic press, a crank shaft coöperating with said press for operating said levers, and auxiliary levers, also operated by said crank shaft for withdrawing the molding pistons from the mold.

2. An agglomerating press comprising a plate with molds therein, a crank shaft, means for rotating the plate from the crank shaft, a press pot, upper and lower molding pistons, upper and lower levers for operating said pistons, a piston operating in the press pot, means for operatively connecting said piston with the upper and lower lever, a second piston within the press pot connected to the crank shaft, and auxiliary levers pivoted to the frame and each having one end bearing on a part of the connection between the levers and their operating piston, and the other end connected with the crank shaft.

3. An agglomerating press comprising a mold carrying plate, a crank shaft, means for rotating the plate from the crank shaft, upper and lower molding pistons, an upper lever connected to the upper molding piston, a lower lever loosely carrying the lower molding piston, a press pot, means coöperating with the crank shaft and press pot for operating the upper and lower levers, and auxiliary levers operated from the crank shaft for returning the lower molding piston to its lowest position.

In testimony whereof I have signed this specification in the presence of two subscribing witnesses.

OCTAVE CROCHET.

Witnesses:
Pierre Corrow,
François Giansily.